US011644894B1

(12) United States Patent
Brimijoin, II et al.

(10) Patent No.: US 11,644,894 B1
(45) Date of Patent: *May 9, 2023

(54) BIOLOGICALLY-CONSTRAINED DRIFT CORRECTION OF AN INERTIAL MEASUREMENT UNIT

(71) Applicant: Meta Platforms Technologies, LLC, Menlo Park, CA (US)

(72) Inventors: William Owen Brimijoin, II, Kirkland, WA (US); Andrew Lovitt, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,098

(22) Filed: Jun. 22, 2022

Related U.S. Application Data

(63) Continuation of application No. 16/774,870, filed on Jan. 28, 2020, now Pat. No. 11,409,360.

(51) Int. Cl.
| | |
|---|---|
| *G06F 3/01* | (2006.01) |
| *G02B 27/00* | (2006.01) |
| *G02B 27/01* | (2006.01) |
| *H04R 5/033* | (2006.01) |
| *H04R 5/04* | (2006.01) |

(52) U.S. Cl.
CPC .......... *G06F 3/012* (2013.01); *G02B 27/0093* (2013.01); *G02B 27/0172* (2013.01); *G06F 3/017* (2013.01); *H04R 5/033* (2013.01); *H04R 5/04* (2013.01); *G02B 2027/0138* (2013.01); *G02B 2027/0178* (2013.01); *H04R 2420/07* (2013.01)

(58) Field of Classification Search
USPC .......................................................... 702/150
See application file for complete search history.

(56) References Cited

U.S. PATENT DOCUMENTS

| | | | |
|---|---|---|---|
| 8,676,498 B2 | 3/2014 | Ma et al. | |
| 9,418,430 B2 | 8/2016 | Choiniere et al. | |
| 11,409,360 B1* | 8/2022 | Brimijoin, II | G02B 27/0172 |
| 2003/0149528 A1* | 8/2003 | Lin | G01C 21/1654 |
| | | | 701/472 |
| 2008/0204361 A1* | 8/2008 | Scales | H04N 5/265 |
| | | | 345/8 |

(Continued)

FOREIGN PATENT DOCUMENTS

WO 2019080046 A1 5/2019

*Primary Examiner* — Chineyere D Wills-Burns
(74) *Attorney, Agent, or Firm* — Fenwick & West LLP

(57) ABSTRACT

A method comprising determining a set of position parameters for an inertial measurement unit (IMU) on a headset worn by a user. The set of position parameters includes at least a first yaw measurement and a first roll measurement. The set describes a pointing vector. The method further comprises calculating a drift correction component that describes a rate of correction. The drift correction component is based at least in part on the set of position parameters. The method further comprises applying the drift correction component to one or more subsequent yaw measurements for the IMU. The drift correction component forces an estimated nominal position vector to the pointing vector at the rate of correction.

20 Claims, 8 Drawing Sheets

(56) References Cited

U.S. PATENT DOCUMENTS

| | | | | |
|---|---|---|---|---|
| 2008/0211768 | A1* | 9/2008 | Breen | G06F 3/012 |
| | | | | 345/157 |
| 2011/0066682 | A1* | 3/2011 | Aldunate | H04L 67/75 |
| | | | | 709/204 |
| 2011/0069841 | A1* | 3/2011 | Angeloff | H04S 7/303 |
| | | | | 348/47 |
| 2016/0077344 | A1* | 3/2016 | Burns | G06F 3/012 |
| | | | | 345/419 |
| 2016/0327394 | A1* | 11/2016 | Al-Rawashdeh | G01M 1/127 |
| 2016/0363460 | A1* | 12/2016 | Sarbishei | G01C 21/16 |
| 2017/0016728 | A1* | 1/2017 | Sheard | G05D 1/10 |
| 2017/0221225 | A1* | 8/2017 | Peri | G06V 10/17 |
| 2018/0088323 | A1* | 3/2018 | Bao | G02B 27/017 |
| 2018/0340779 | A1* | 11/2018 | Faulkner | F42B 15/01 |
| 2019/0041979 | A1* | 2/2019 | Kirchner | B64D 43/00 |
| 2019/0204083 | A1* | 7/2019 | Felice | G01C 25/00 |
| 2019/0212824 | A1* | 7/2019 | Keller | G06K 19/07762 |
| 2019/0235622 | A1* | 8/2019 | Tu | G06F 3/167 |
| 2020/0045491 | A1* | 2/2020 | Robinson | H04R 5/033 |
| 2020/0137488 | A1* | 4/2020 | Lovitt | H04R 5/04 |
| 2020/0285062 | A1* | 9/2020 | Grutman | G06F 1/1626 |
| 2020/0334837 | A1* | 10/2020 | Feigl | G06T 7/0002 |
| 2021/0029479 | A1* | 1/2021 | Donley | H04R 29/005 |

* cited by examiner

500

---

Determine, by a controller, a set of position parameters for an IMU on a headset worn by a user, the set of position parameters including at least a first yaw measurement and a first roll measurement, the set describing a pointing vector
510

---

Calculate, by the controller, a drift correction component that describes a rate of correction, the drift correction component based at least in part on the set of position parameters
520

---

Apply, by the controller, the drift correction component to one or more subsequent yaw measurements for the IMU, the drift correction component forcing than estimated nominal position vector towards the pointing vector at the rate of correction
530

BIOLOGICALLY-CONSTRAINED DRIFT CORRECTION OF AN INERTIAL MEASUREMENT UNIT

CROSS REFERENCE TO RELATED APPLICATIONS

This application is a continuation of co-pending U.S. application Ser. No. 16/774,870, filed Jan. 28, 2020, which is incorporated by reference in its entirety.

FIELD OF THE INVENTION

This disclosure relates generally to inertial measurement unit (IMU) drift correction, and more specifically to biologically constrained drift correction of an IMU.

BACKGROUND

An inertial measurement unit (IMU) is an electronic device that can include multiple measurement tools (e.g., an accelerometer, a gyroscope, a magnetometer, etc.). The IMU, when integrated into a device (e.g., a headset), can measure a position of the device. Typically, IMUs can suffer from measurement errors (also known as drift) that are accumulated over time.

SUMMARY

A drift compensation system for an inertial measurement unit (IMU) based on biologically-constrained drift correction. The system comprises the IMU integrated into a headset worn by a user. The IMU on the headset tracks the position of the headset and the position of the head of the user wearing the headset. The positioning of the head of the user is biologically-constrained (i.e., the head may only be positioned in certain ways). Utilizing one or more biological constraints and a set of position parameters, a drift correction component may be found and used to compensate for drift present in the IMU over time. The set of position parameters may include, e.g., a yaw measurement, a roll measurement, etc. for the headset. In some embodiments, other secondary devices may be used to determine some of the position parameters for the headset. For example, the secondary devices may determine pose information. The secondary devices may provide, in accordance with one or more privacy settings of the user, the pose information to the IMU of the headset to be included in the set of position parameters. The set of position parameters are utilized to determine the drift correction component. The drift correction component is applied to subsequent yaw measurements of the IMU. The drift correction component effectively adjusts for any drift error present in the subsequent yaw measurements, thereby compensating for drift present in the IMU over time.

In some embodiments, a method is disclosed for correcting drift of an IMU. The method comprises determining a set of position parameters for an inertial measurement unit (IMU) on a headset worn by a user. The set of position parameters includes at least a first yaw measurement and a first roll measurement. The set describes a pointing vector. The method further comprises calculating a drift correction component that describes a rate of correction. The drift correction component is based at least in part on the set of position parameters. The method further comprises applying the drift correction component to one or more subsequent yaw measurements for the IMU. The drift correction component forces an estimated nominal position vector to the pointing vector at the rate of correction. In some embodiments, a non-transitory computer readable medium configured to store program code instructions is disclosed that when executed by a processor, cause the processor to perform the steps described above.

In some embodiments, a headset is disclosed including an IMU and a controller. The IMU is configured to measure positions of the headset. The controller is configured to determine a set of position parameters. The set of position parameters including at least a first yaw measurement and a first roll measurement for the headset. The set describes a pointing vector. The controller is further configured to calculate a drift correction component that describes a rate of correction. The drift correction component is based at least in part on the set of position parameters. The controller is further configured to apply the drift correction component to one or more subsequent yaw measurements of the IMU. The drift correction component forces an estimated nominal position vector to the pointing vector at the rate of correction.

BRIEF DESCRIPTION OF THE DRAWINGS

FIG. 5 is a flowchart illustrating a process for correcting drift of an inertial measurement unit (IMU), in accordance with one or more embodiments.

Figure 1A:
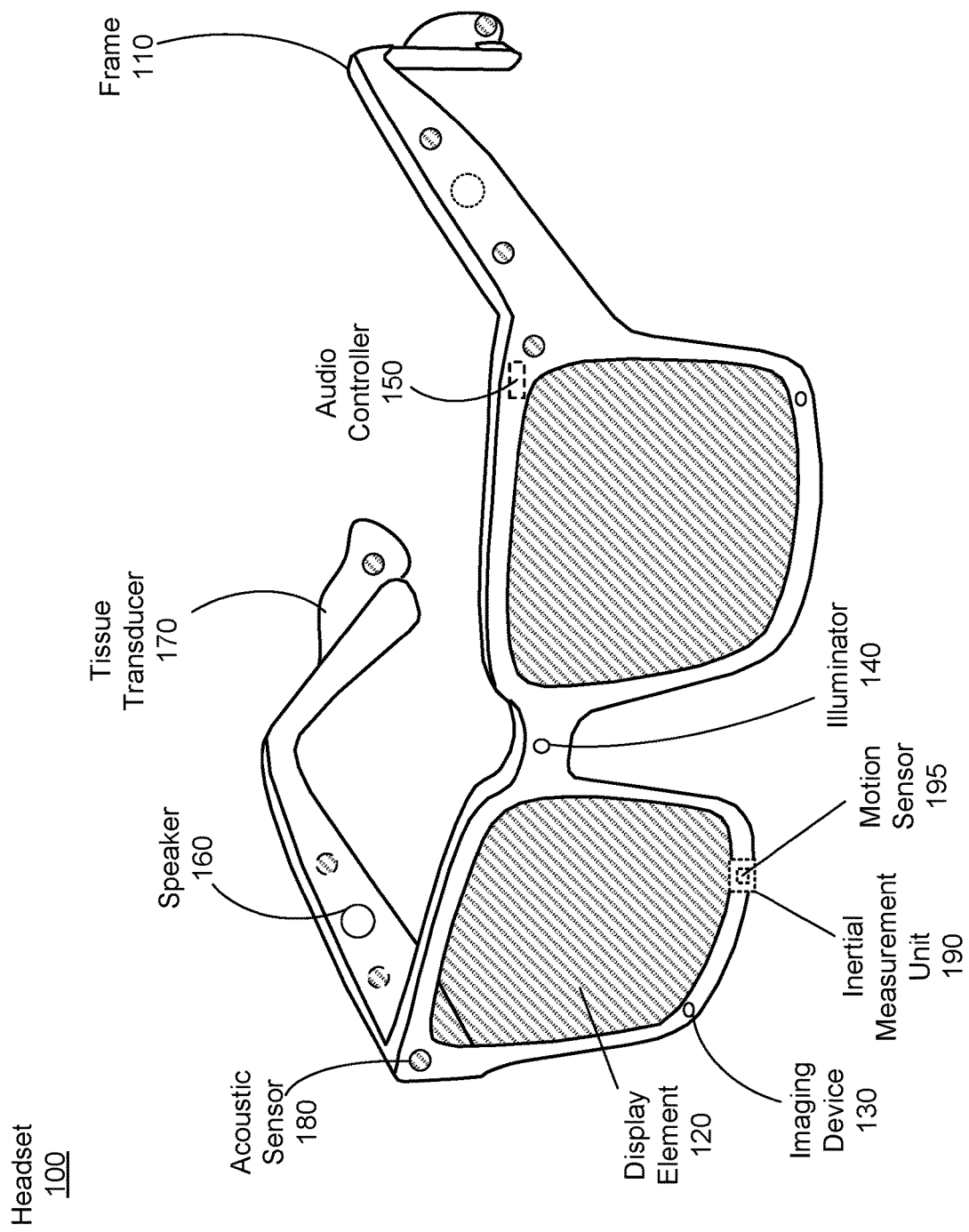
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Configuration Overview

A drift compensation system for an inertial measurement unit (IMU) based on biologically-constrained drift correction. The system comprises the IMU integrated into a headset worn by a user. The IMU of the headset tracks the position of the headset. The IMU may track the position of the headset in terms of yaw, roll, and pitch measurements. The measurements may be in terms of an angle measurement (e.g., in degrees or in radians) and/or in terms of a rate (e.g., in degrees per second, in radians per second, etc.). When the user is wearing the headset, the yaw measurement relates to the amount the user turns their head to the left or to the right (i.e., a rotation about the yaw axis). The roll measurement relates to the amount the user tilts their head to the left and to the right (i.e., a rotation about the roll axis). The pitch measurement relates to the amount the user tilts their head up and down (i.e., a rotation about the pitch axis). The IMU tracks the current yaw, roll, and pitch measurement relative to the last yaw, roll, and pitch measurement (i.e., the IMU is measuring changes in yaw, roll, and pitch measurements relative to the last yaw, roll, and pitch measurements). The IMU suffers from drift (i.e., an increasing difference in the actual position of the headset and the measured position of the headset).

The head of the user is biologically-constrained in its positioning. A biological constraint of the user is a limitation or restriction that is based in part on the user's biology (e.g., how the head moves via the neck relative to the torso). For instance, the head of the user may only turn from the far left to the far right a maximum of 180 degrees (i.e., maximum yaw measurement). The head of the user may only tilt a maximum of 90 degrees (i.e., maximum roll measurement or maximum pitch measurement). Over time, the head of the user generally remains at some nominal position (e.g., squared to the shoulders looking straight ahead). A nominal position of the user may be established based on the positioning of the head of the user as the head of the user remains still over a predetermined time period. The nominal position may differ from user to user. For example, a nominal position of one user may have the head facing towards the front (i.e., squared with shoulders) with little to no tilt, and a nominal position for a different user may also have the head at a different position. A nominal position may be associated with a yaw measurement, a roll measurement, and a pitch measurement of zero degrees. After the neck of the user turns the head of the user to the left or to the right (i.e. introduces some yaw), the neck also tilts the head of the user (i.e., introduces some roll).

Utilizing the biological constraints and a set of position parameters, a drift correction component may be determined and may be used to compensate for drift present in the IMU over time. The set of position parameters may include, e.g., a yaw measurement, a roll measurement, a pitch measurement for the headset. The set of position parameters may be determined by the IMU of the headset. In some embodiments, other secondary devices (e.g., other headsets, other mobile devices, etc.) may be used to determine some or all of the position parameters. The position parameters may include pose information about the user. Pose information describes the positioning of the head of the user. The pose information may include additional position measurements (i.e., a second yaw, roll, and pitch measurement), an indication the head positioning of the user has undergone a change, a notification of the type of change (i.e., a change in yaw, a change in roll, a change in pitch, or some combination thereof) the head positioning has undergone, or some combination thereof. In one embodiment, the secondary device may determine pose information based on changes in sound detected by an audio system of the secondary device. In another embodiment, the headset may determine pose information based on changes in sound detected by an audio system of the headset. In one embodiment, the secondary device may determine pose information based on an analysis of one or more images of a head (including the headset) and a torso of the user captured by the secondary device. In another embodiment, the headset may determine pose information based on an analysis of one or more images of a head (including the headset) and a torso of the user provided by the secondary device, in accordance with one or more privacy settings of the user. The secondary device may determine pose information by utilizing an IMU integrated into the secondary device. The secondary device may provide, in accordance with privacy settings of the user, the pose information to the IMU to be included in the set of position parameters.

The set of position parameters and the biological constraints of the positioning of the head of the user are utilized to determine the drift correction component. The drift correction component describes a rate of correction. The drift correction component is applied to subsequent measurements (e.g., yaw measurements) of the IMU at the rate of correction. The drift correction component forces an estimated nominal position vector (i.e., a vector based on the nominal positioning of the head of the user) to a pointing vector (i.e., a vector based on the current measured positioning of the head of the user) during the subsequent measurements of the IMU. The drift correction component may include a yaw drift rate measured in degrees over time. The yaw drift rate may be inversely proportional to the amount of roll measured. In some embodiments, the drift correction component may further include a roll drift rate measured in degrees over time. In some embodiments, the drift correction component effectively adjusts for any drift error present in the subsequent yaw measurements, thereby compensating for drift present in the IMU over time.

Note that there are many conventional methods of drift compensation for IMUs to help account for drift error. For instance, some conventional methods may use simple integration, a filter (e.g., a low-pass filter, a Kalman filter, etc.), sensor fusion algorithms, or some combination thereof to correct a portion of the drift error. But conventional methods for mitigating drift error of IMUs may still have substantial drift error (i.e., residual drift error and/or integration drift error). The drift compensation system for an IMU based on biologically-constrained drift correction may be used with the conventional methods of drift correction to compensate for the residual drift error that is not accounted for in the approximation.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Headset Examples

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and an IMU 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. In some embodiments, the captured images may include one or more headsets, one or more users of the headsets, or some combination thereof. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, determine pose information for each tracked sound source, form beams in the direction of sound sources, classify sound sources, generate sound filters for the speakers 160, or some combination thereof.

The IMU 190 determines the position of the headset 100. The IMU 190 further determines the position of the head of the user wearing the headset 100. The IMU 190 includes a motion sensor 195 and a controller. However, in other embodiments, the IMU 190 may include different and/or additional components. Similarly, in some cases, functionality described with reference to the components of the IMU 190 can be distributed among the components in a different manner than is described here. For example, some or all of the functions of the controller may be performed by a remote server. In another example, some or all of the functions of the controller may be performed by a separate system on the headset 100. The functions and components of the IMU 190 are described in further detail with reference to FIG. 4.

The motion sensor 195 generates one or more measurement signals in response to motion of the headset 100. The motion sensor 195 may be located on a portion of the frame 110 of the headset 100. Examples of motion sensor 195 include: one or more accelerometers, one or more gyroscopes, one or more magnetometers, another suitable type of sensor that detects motion, or some combination thereof. The motion sensor 195 may be located external to the IMU 190, internal to the IMU 190, or some combination thereof.

The controller compensates for any drift error present in the measurement signals from the motion sensor 195. The controller may be configured to communicate with one or more secondary devices (e.g., a separate headset) via a network, determine a set of position parameters, determine a drift correction component, apply the drift correction component, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the motion sensor 195 tracks the position (e.g., location) of the headset 100 within the room. Additional details regarding the components of the headset 100 are discussed below in connection with FIG. 6.

The IMU 190 of the headset 100 compensates for drift over time. The IMU 190 tracks the position of the headset 100 and the position of the head of the user wearing the headset 100. The IMU 190 determines some or all of the position parameters (e.g., a yaw measurement, a roll measurement, a pitch measurement, etc.) for the headset via measurements of the motion sensor 195 and integrations performed by the controller. The controller of the IMU 190 determines a drift correction component by considering the biological constraints of the positioning of the head of the user and the set of position parameters. The biological constraints are further described with reference to FIGS. 2A and 2B. The set of position parameters are further described with reference to FIGS. 2A, 2B, and 3. In some embodiments, the controller determines the drift correction component utilizing position parameters supplied by other secondary devices (e.g., other headsets). The controller applies the drift correction component to an estimated nominal position vector during subsequent yaw measurements of the motion sensor 195 of the IMU 190. The drift correction component effectively adjusts for any drift error (e.g., residual drift error) present in the subsequent yaw measurements, thereby compensating for drift present in the IMU 190 over time. The drift compensation process for an IMU 190 is further described with reference to FIGS. 4 and 5.

Figure 1B:
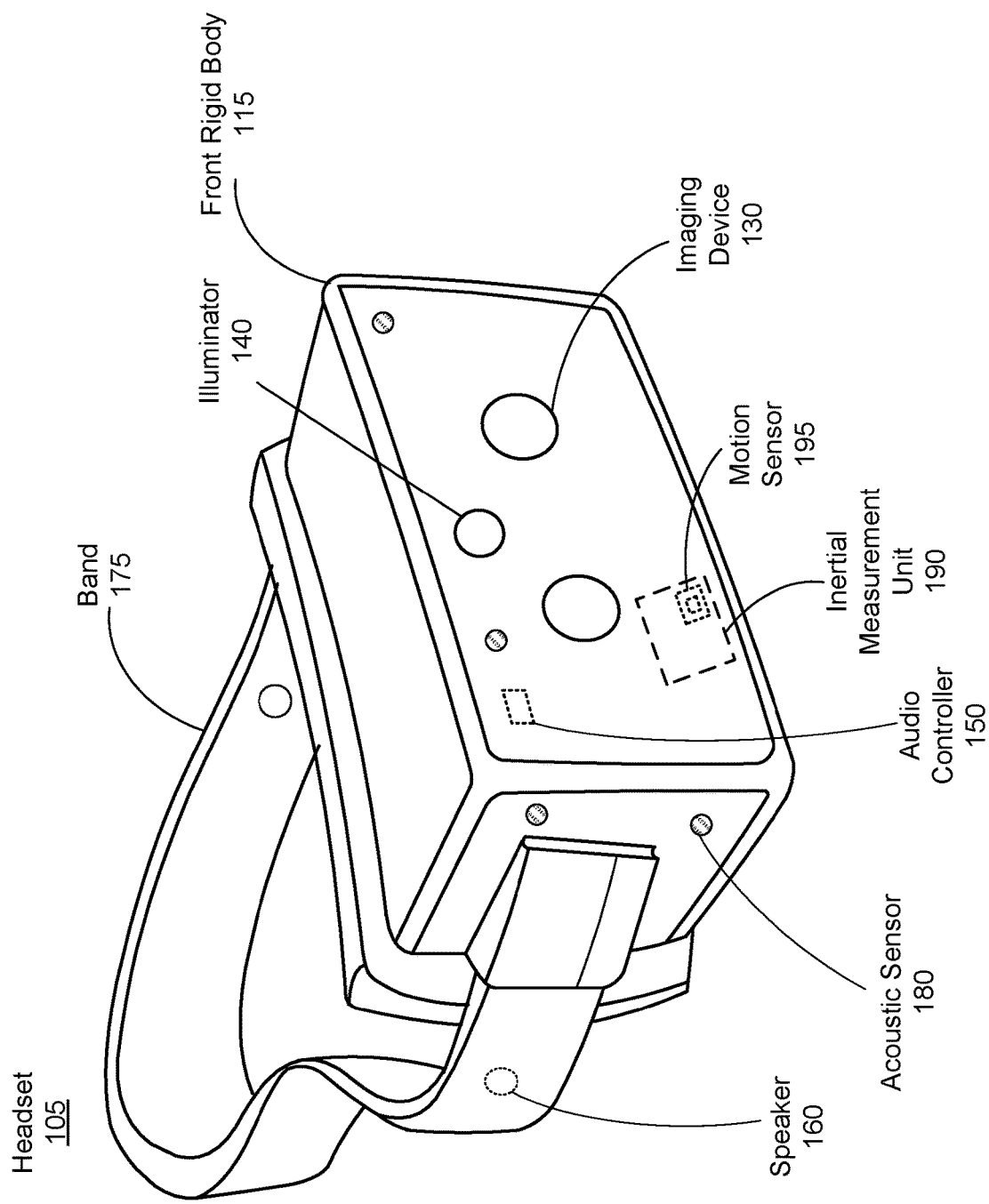
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 650 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and an IMU 190 of FIG. 1A. FIG. 1B shows the illuminator 140, a plurality of the speakers 160, a plurality of the imaging devices 130, a plurality of acoustic sensors 180, and the motion sensor 195. The speakers 160 may be located in various locations, such as coupled to the band 175 (as shown), coupled to front rigid body 115, or may be configured to be inserted within the ear canal of a user.

Example IMU Drift Correction Scenarios

Figure 2A:
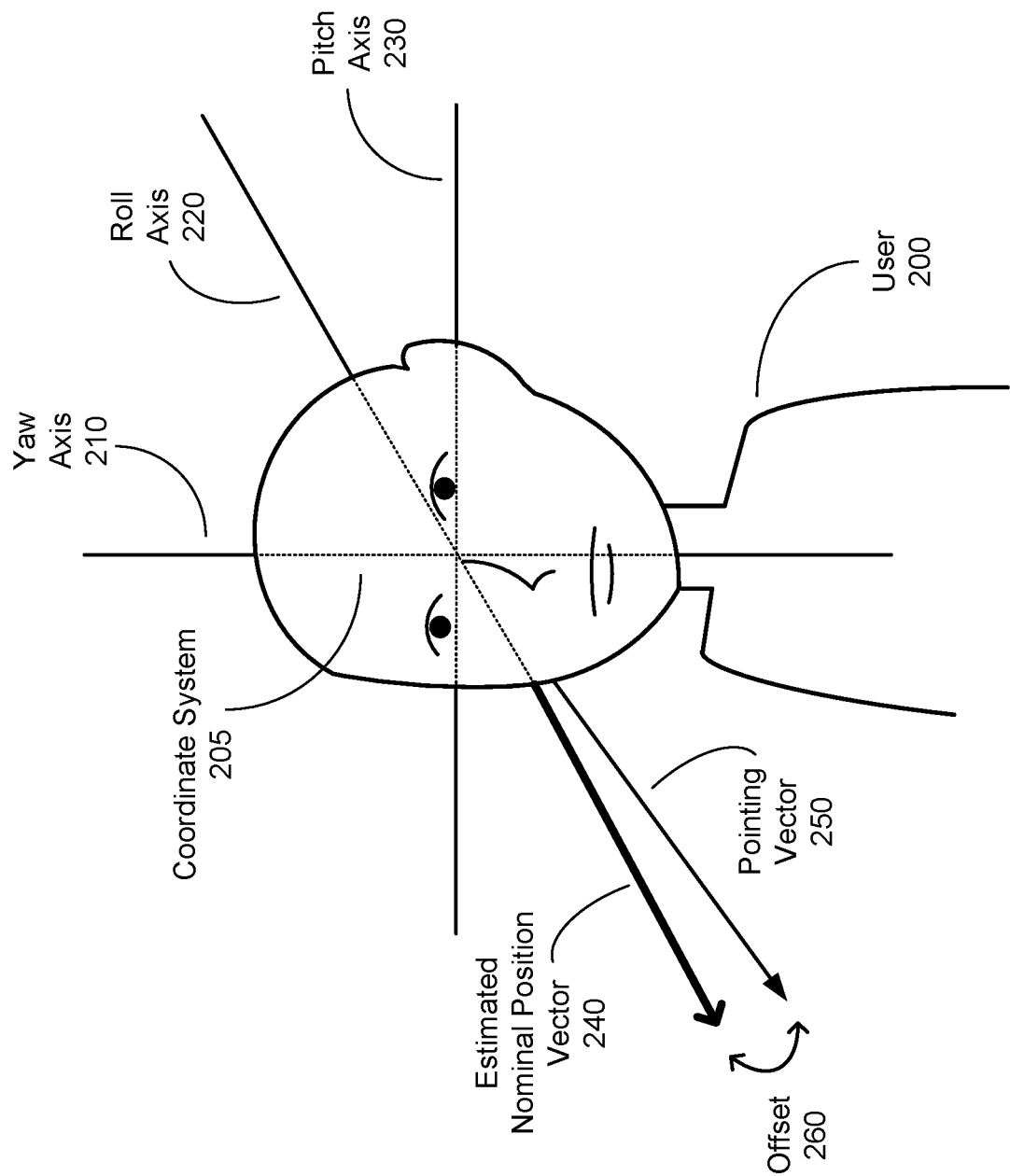
FIG. 2A illustrates an IMU drift correction scenario for a user, in accordance with one or more embodiments.

FIG. 2A illustrates an IMU drift correction scenario for a user 200, in accordance with one or more embodiments. For FIGS. 2A and 2B, the user 200 is wearing a headset device (e.g., the headset 100 and/or the headset 105) that is not shown. In FIG. 2A, a coordinate system 205 is centered in the head of the user 200, and represents what an IMU (e.g., the IMU 190) of the headset has estimated to be a nominal position of a head of the user 200. And movement of the head is measured relative to this coordinate system 205 (i.e., the nominal head position). The coordinate system 205 depicts a yaw axis 210, a roll axis 220, and a pitch axis 230.

A controller of the headset of the user 200 determines a set of position parameters describing the movement of the head, e.g., a yaw measurement, a roll measurement, and a pitch measurement. The yaw measurement is an angular measurement in terms of rotation about the yaw axis 210. The roll measurement is an angular measurement in terms of rotation about the roll axis 220. The pitch measurement is an angular measurement in terms of rotation about the pitch axis 230.

An estimated nominal position vector 240 is a vector representation of the coordinate system 205 that estimates the nominal position of the head of the user 200. The estimated nominal position vector 240 is aligned with and overlaps with a portion of the roll axis 220. The estimated nominal position vector 240 may include, e.g., a yaw measurement value, a roll measurement value, a pitch measurement value, or some combination thereof. A pointing vector 250 depicts the measured position of the head of the user 200 as a vector as determined by the controller. The pointing vector 250 may include, e.g., a yaw measurement value, a roll measurement value, a pitch measurement value, or some combination thereof. The measurement values of the pointing vector 250 are based on movement of the head of the user 200 and measured relative to the estimated nominal position vector 240.

Over time, the estimated nominal position vector 240 may experience drift. Drift causes the estimated nominal position vector 240 to become offset from an actual nominal position of the head. The offset causes a difference between the IMU measurement of the positioning of the head of the user 200 (i.e., the pointing vector 250) and an actual positioning of the head of the user 200. For instance, in FIG. 2A, the head is positioned in the nominal head position (e.g., positioned with the head and shoulders square and with no turn or tilt in the head positioning). A first IMU measurement (not shown) would show the estimated nominal position vector 240 and the pointing vector 250 being substantially the same. As drift occurs an offset 260 between the estimated nominal position vector 240 and the pointing vector 250 can become larger. For example, a subsequent IMU measurement may show the offset 260 between the estimated nominal position vector 240 and the pointing vector 250. The offset 260 being the difference in yaw measurements, roll measurements, pitch measurements, or some combination thereof, between the estimated nominal position vector 240 and the pointing vector 250.

One method to correct for drift errors involves compensating for drift present in the IMU over time. The drift correction takes into consideration biological constraints of the user 200. The head of the user 200 is biologically-constrained in its positioning. For example, the head of the user 200 may turn from the far left to the far right (i.e., rotate about the yaw axis 210) a maximum of 180 degrees (i.e., maximum yaw measurement). In another example, the head of the user 200 may tilt a maximum of 90 degrees (i.e., maximum roll measurement or maximum pitch measurement). Another example of a biological constraint is that the head of the user 200, over time, generally remains still. A nominal position of the user 200 may be determined based on this biological constraint.

The controller of the headset may detect patterns of movement of the user over time. The detected patterns of movement may be used to determine the nominal position of the head of the user. In one embodiment, the nominal position of the head may be determined using multiple measurements (e.g., multiple yaw measurements, roll measurements, pitch measurements, or some combination thereof) taken at different times. Over a course of a time period (e.g., 10 minutes, an hour, etc.) the head may have multiple poses, and the nominal position of the head generally corresponds to the pose at which the head is positioned the longest for the time period. Accordingly, the measurements of yaw, roll, and pitch, are used to determine for a given time period a pose at which the head remains the longest and, as described below, the controller may drive the estimated nominal position vector 240 toward the pointing vector 250 associated with the pose. In some embodiments, the nominal position for the head may have the head squared to the shoulders looking straight ahead. In another example, the nominal position for the head may be have the head tilted in some manner relative to the shoulders. For instance, the user may consistently position their head with a slight turn to the left and a slight tilt down to the right during the hours of 9:00-10:00 am. This detected pattern of movement is considered the nominal position of the user between the hours of 9:00-10:00 am. In the embodiment of FIG. 2A, the nominal position of the user 200 is the torso and the head of the user 200 both facing forward with no turn or tilt to the head (i.e., the head of the user 200 is squared with the shoulders of the user 200).

The IMU of the headset worn by the user 200 takes measurements (e.g., acceleration and/or velocity measurements) of the head positioning in response to detected motion of the head. The measurements are integrated over time to determine yaw, roll, and pitch measurements. A set of position parameters for the user 200 may include the yaw, roll, and pitch measurements. In some embodiments, the IMU may take a specified number of measurements during a predetermined time period. For example, the IMU may determine measurements at any rate equal to or less than a maximum sample rate for the IMU. The maximum sample rate is chip-dependent and may be between 100 Hertz (Hz) to 10 kHz. In one embodiment, after the predetermined period of time, the controller may average the yaw, roll, and pitch measurements to determine a pointing vector 250. The pointing vector 250 comprises an average yaw measurement, an average roll measurement, and an average pitch measurement for the predetermined period of time. In another embodiment, the pointing vector 250 comprises one set of measurements (i.e., a yaw, roll, and pitch measurement) determined by the controller. The pointing vector 250 may be compared to the estimated nominal position vector 240 (i.e., the yaw, roll, and pitch values of the pointing vector 250 are compared with the yaw, roll, and pitch values of the estimated nominal position vector 240). Any difference in measurements between the pointing vector 250 and the estimated nominal position vector 240 comprises an offset. The offset comprises one or more of a yaw value, a roll value, and a pitch value. The offset values may be positive, negative, zero, or some combination thereof. Drift compensation of the IMU may occur if the offset yaw, roll, and/or pitch values are greater than or less than zero.

The offset yaw, roll, and/or pitch values may be greater than or less than zero for certain head positions (e.g., head is turned), when drift is present in the IMU measurements, or some combination thereof. In some embodiments, yaw measurements may be more sensitive to drift errors than roll and/or pitch measurements. To correct for drift, the controller determines a drift correction component. The drift correction component is a rate of correction that drives the estimated nominal position vector 240 toward the pointing vector 250 based on the offset yaw, roll, and/or pitch values. The drift compensation takes place at a rate of correction (e.g., degrees over time). In some embodiments, the rate of correction may be based at least in part on the offset roll value, and the rate is inversely proportional to the offset roll value. For instance, due to a biological constraint, as the neck of the user 200 turns the head of the user 200 to the left or to the right (i.e. introduces a change in yaw), the neck also tilts their head (i.e., introduces a change in roll). In this example, the offset yaw and roll values may be greater than or less than zero due to the head of the user 200 moving or due to a combination of the head of the user 200 moving and drift being present in the IMU measurements. And as the rate of correction is inversely proportional to the offset roll value, as the offset roll value increases the rate of correction decreases. A typical rate of correction may be, e.g., 1-2 degrees per minute. In some embodiments, the rate of correction is proportionally scaled with an averaged velocity measurement. The controller tracks the velocity measurements of the head turn and averages the velocity measurements for the predetermined time period. The rate of correction is scaled according to the average velocity. For example, as the average velocity increases the rate of correction increases.

The drift correction component is applied to subsequent yaw, roll, and/or pitch measurements of the IMU. This application of the drift correction component, over time, forces the estimated nominal position vector 240 to the pointing vector 250, thereby eliminating offset in subsequent measurements of the IMU.

Figure 2B:
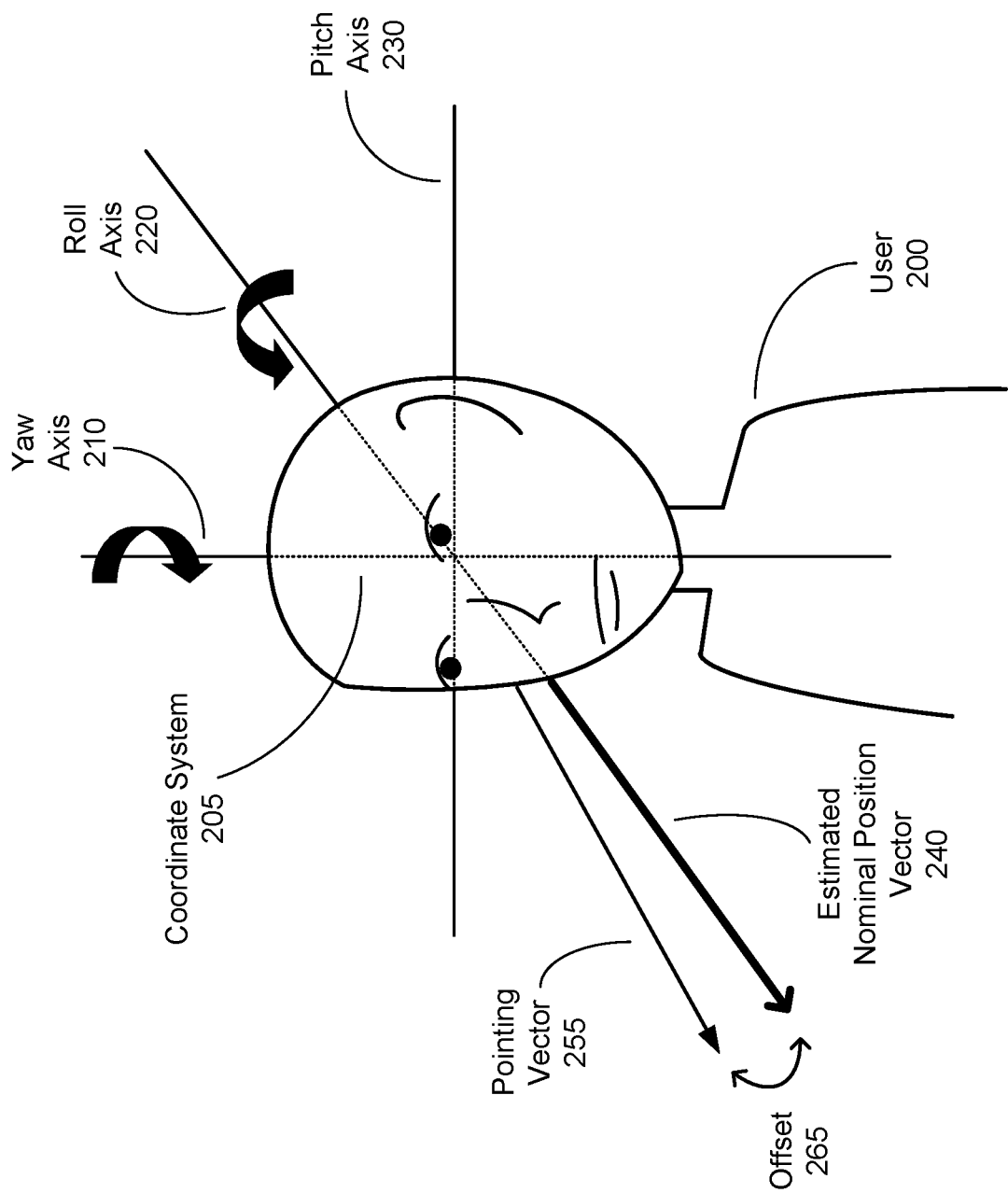
FIG. 2B illustrates a IMU drift correction scenario for a user with their head turned, in accordance with one or more embodiments.

FIG. 2B illustrates a IMU drift correction scenario for a user 200 with their head turned, in accordance with one or more embodiments. A neck of the user 200 has turned a head of the user 200 to the right and tilted the head down to the right while a torso of the user 200 remained stationary. This corresponds to a rotation about the yaw axis 210 and a rotation about the roll axis 220. The IMU determines the position of the head. The controller determines a pointing vector 255 based on the new positioning of the head. The estimated nominal position vector 240 and the pointing vector 255 are not aligned in FIG. 2B, and there is an offset 265 between the two vectors. The controller determines a drift correction component that has a rate of correction. The drift correction component may align the estimated nominal position vector 240 with the pointing vector 255 with the determined rate of correction. In this example, the head is turned (e.g., user 200 is looking to the right) and the head is tilted (e.g., user 200 is looking down). The controller bases the rate of correction in part on the measured offset in yaw and roll. In the case of a head being turned, the rate of correction is substantially slower than, e.g., the case of a small offset (e.g., FIG. 2A). Accordingly, the controller is able to effectively discriminate between substantial changes in head pose (e.g., user looking to right, left, etc.) with drift of the IMU.

System Environment

Figure 3:
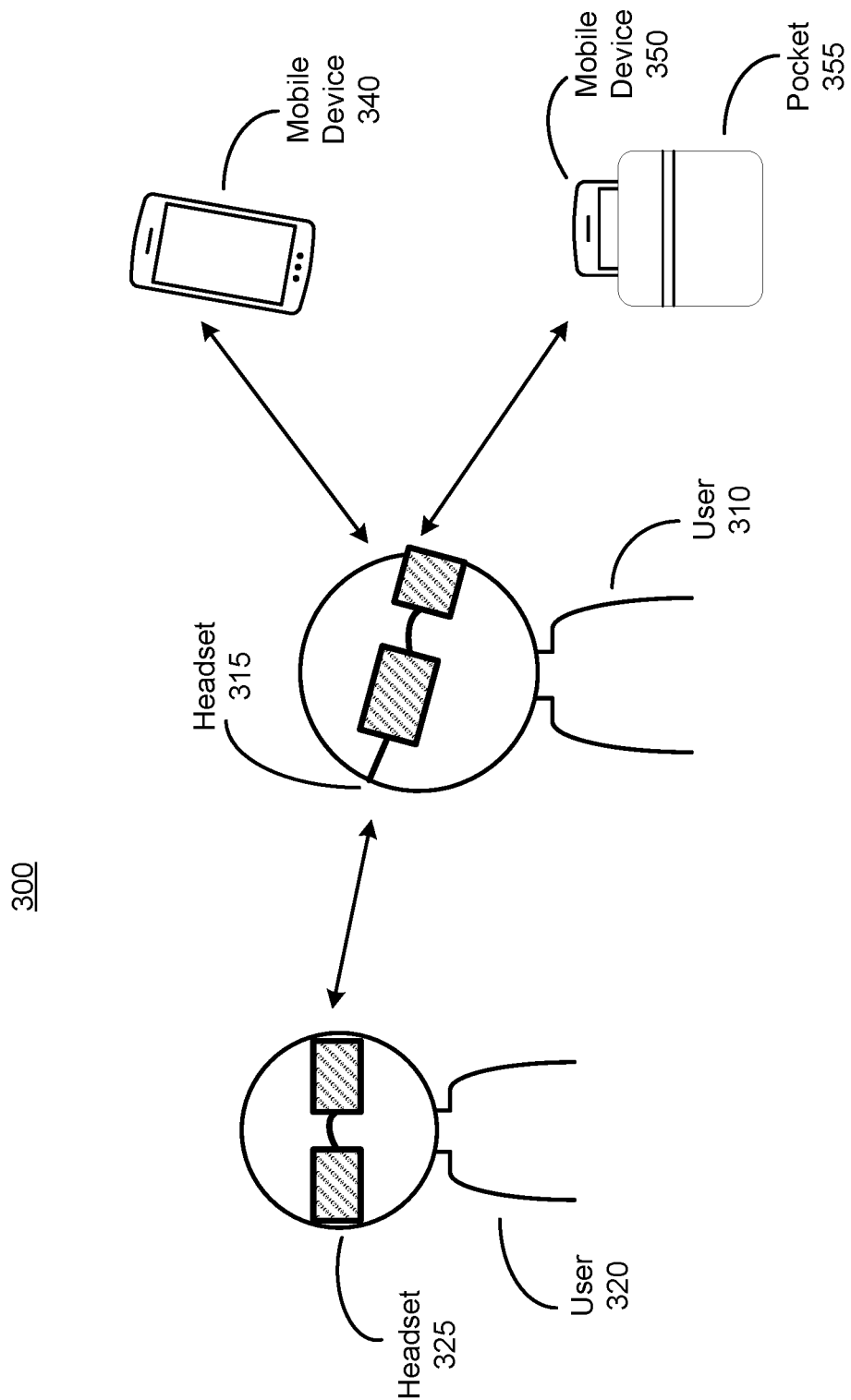
FIG. 3 is a schematic diagram of a high-level system environment for correcting drift of an inertial measurement unit (IMU) of a headset utilizing pose information determined by other connected secondary devices, in accordance with one or more embodiments.

FIG. 3 is a schematic diagram of a high-level system environment 300 for correcting for drift of an inertial measurement unit (IMU) of a headset 315 utilizing pose information determined by other connected secondary devices, in accordance with one or more embodiments. Secondary devices are remote devices that include one or more imaging devices (e.g., a camera), a speaker array, or some combination thereof. The secondary devices are separate from and connected to (via a network) the headset 315. Secondary devices may be, e.g., a separate headset, a mobile device, a laptop, or some combination thereof. Each user (i.e., a user 310 and a user 320) illustrated in FIG. 3 is wearing a headset (i.e., a headset 315 and a headset 325, respectively). Each headset in FIG. 3 may be the headset 100 of FIG. 1A or the headset 105 of FIG. 1B. In FIG. 3, the head of the user 310 is positioned with a turn to the left and a tilt down to the left. The user 310 may be experiencing a change in both yaw and roll. The head of the user 320 is positioned with no turn nor tilt, i.e., the head of the user 320 is not experiencing a change in either yaw or roll.

The headsets can communicate with one another via a network. In some embodiments, the network may be a wireless personal area network (WPAN) between two devices. The WPAN is a computer network for interconnecting devices over a low-powered, short distance wireless network. For example, the WPAN may include infrared data association (IrDA), wireless USB, Bluetooth, ZigBee. In some embodiments, the network may be a public network via a server that is accessible to many devices. The network may include links using technologies such as 802.11, worldwide interoperability for microwave access (WiMAX), 2G/3G/4G mobile communications protocols, asynchronous transfer mode (ATM), InfiniBand, PCI Express Advanced Switching, etc. Similarly, the networking protocols used on the network can include multiprotocol label switching (MPLS), the transmission control protocol/Internet protocol (TCP/IP), the User Datagram Protocol (UDP), the hypertext transport protocol (HTTP), the file transfer protocol (FTP), etc. The data exchanged over the network can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

In one example, the headsets access and send information via the wireless personal area network after the users of the headsets establish an express authorization to do so. In one embodiment, express authorization is established when one headset of one user recognizes the headset of another user and directly links (i.e., connects through a wireless personal area network) the headset devices. This recognition may be based on a social graph of the users. The social graph of a user includes information about connections between users. If two users are connected on their respective social graphs, the headset of one user directly links to the headset of the other user. In some embodiments, express authorization is established when one headset of one user recognizes the user of another headset (e.g., using facial recognition techniques).

In one embodiment, the user 310 is located in the same local area of the user 320 and within a field of view of the one or more imaging devices of the headset 325 and/or heard by the microphone array of the headset 325. For instance, the user 310 and the user 320 may be having a conversation with one another in a room. The user 310 and the user 320 may start with their heads and torsos facing the other with no turn or tilt (not shown) of their head. This starting position is associated with a nominal position for the user 310 and the user 320. The user 310 and the user 320 are friends (i.e., are connecting via a social graph with each other) and the headset devices of each of the users recognizes this connection. The user 310 has allowed (i.e., updated privacy settings to allow) devices belonging to friends to capture images and sounds of themselves. The user 320 has allowed (i.e., updated privacy settings to allow) devices belonging to friends to capture images and sounds of themselves. In this embodiment, the headset 325 captures images of the user 310 via one or more imaging devices (e.g., the imaging devices 130) and the headset 315 of the user 310 captures images of the user 320 via one or more imaging devices. The captured images include images of a head (including the headset) and a torso of the user 310 and the user 320. The neck of the user 310 begins to turn the head of the user 310 to the left and tilt the head of the user 310 down to the left as illustrated in FIG. 3.

The headset 325 may determine pose information for the user 310 in accordance with the user's permissions and/or express authorization. The pose information is determined based on the one or more images of the user 310 captured by the headset 325 (as described below in FIG. 4). The pose information may be sent, in accordance with one or more privacy settings of the user 310, from the headset 325 to the headset 315 (as described below in FIG. 4). In another scenario, the headset 325 may send, in accordance with privacy settings of the user 310, the captured images of the user 310 to the headset 315. The headset 315 receives the captured images and determines pose of the user 310 based on the received images. The pose information of the user 310 may be utilized in the set of position parameters in the drift compensation of the IMU of headset 315. The pose information may include additional position measurements for the head of the user 310 (i.e., a second yaw, roll, and pitch measurement), an indication the head positioning of the user has undergone a change, a notification of the type of change (i.e., a change in yaw, a change in roll, a change in pitch, or some combination thereof) the head positioning has undergone, or some combination thereof. The pose information may be utilized by the headset 315 to determine a drift correction component. Pose information provided by the secondary device may be weighted and contribute to the determination of the drift correction component accordingly as described in further detail in FIG. 4.

In this same embodiment, where the user 310 is located in the same local area as the user 320, an audio system via a sensor array of the headset 325 of the user 320 may be detecting changes in audio from a sound source (e.g., the user 310) in accordance with the user's permissions and/or express authorization. During the conversation between the user 310 and the user 320, the neck of the user 310 begins to turn the head of the user 310 to the left and tilt the head of the user 310 down to the left as illustrated in FIG. 3. The headset 325 of user 320 may be detecting a change in head position of the user 310 by detecting a change in audio. The change in audio may be a change in pitch, in tone, in loudness, or some combination thereof, of the audio signal. The change in audio may be a change in the timing and/or level of the audio signal. The detected change in audio may be determined to be caused by a change in the head positioning of the sound source (i.e., a change in the head positioning of the user 310). In one embodiment, this may be determined by comparing a current DOA estimate with a stored history of previous DOA estimates, and in response to a change in the current DOA estimate for the sound source, the audio controller may determine that the head positioning of the sound source has changed. In another embodiment, the detected change in loudness is associated with the sound source turning their head to the left or to the right. In one example, the audio system of the headset 325 detects a change in loudness as the neck of the user 310 begins to turn the head of the user 310 to the left and tilt the head of the user 310 down to the left. In one embodiment, the audio system of the headset 325 provides, in accordance with one or more privacy settings of the user 310, information about the detected change in audio to the headset 315. In this embodiment, the controller of the headset 315 may determine pose information based on the received information about the detected change in audio. The pose information may be included in the set of position parameters. In another embodiment, the audio system of the headset 325 provides, in accordance with privacy settings of the user 310, pose information to the headset 315 to be included in the set of position parameters for the IMU of the headset 315. In this embodiment, the pose information may include an indication the head positioning of the user 310 has undergone a change and a notification of the type of change (e.g., the user 310 experienced a change in yaw). The headset 315 receives this pose information and may weight the pose information accordingly as described in further detail in FIG. 4.

In some embodiments, multiple users may be located in the same local area. For instance, the user 310 and the user 320 are located in the same local area with other users (not shown). Each headset may be detecting position parameters, such as yaw measurements, roll measurements, and pitch measurements for the corresponding user. The position parameters determined by one headset may be sent to another headset, in accordance with one or more privacy settings of the corresponding user. For instance, the position parameters of headset 325 (i.e., a second set of position parameters) may be sent to headset 315, in accordance with privacy settings of the user 310. The second set of position parameters may be combined with the set of position parameters of the IMU of the headset 315 in the determination of the pointing vector as described in further detail in FIG. 4.

In FIG. 3, a mobile device 340 belonging to the user 310 may capture images of the user 310 in accordance with the user's permissions and/or express authorization. The captured images include images of a head (including the headset) and a torso of the user 310. The images may be sent from the mobile device 340 to the headset 315 via the network, in accordance with privacy settings of the user 310. The headset 315 may determine pose information about the user 310 based on the images. The pose information of the user 310 may include the head orientation of the user 310. The pose information may be combined with other position parameters of the headset 315 during the drift compensation process of the IMU of the headset 315 as described above. In another embodiment, the mobile device 340 is held up to the ear of the user 310 during a phone call. The mobile device 340 contains a separate IMU that tracks the position and/or orientation of the mobile device 340 (i.e., the separate IMU is determining a second set of position parameters). This second set of position parameters are provided to the headset 315 and combined with the position parameters of the headset 315 determined by the headset 315 during the drift compensation process as described in further detail in FIG. 4.

In FIG. 3, a mobile device 350 belonging to the user 310 is placed in a pocket 355 of clothing (e.g., jeans, jacket, shirt, etc.) the user 310 is wearing. The mobile device 350 may detect audio in the local area in accordance with the user's permissions and/or express authorization. The audio may include sounds made by the user 310 (e.g., talking, singing, other verbal communication, etc.). As the user 310 is generating sounds and the neck of the user 310 is turning the head of the user 310 to the left or to the right and/or tilting the head of the user 310 to the left or to the right and/or tilting the head of the user 310 up or down, the mobile device 350 detects a change in audio. The detected change in audio may provide an indication that the head positioning of the user has changed and/or what type of change the head positioning of the user is experiencing. This pose information may be provided, in accordance with one or more privacy settings of the user 310, to the headset 315 during the drift compensation process of the IMU of the headset 315 as described in further detail in FIG. 4.

Inertial Measurement Unit

Figure 4:
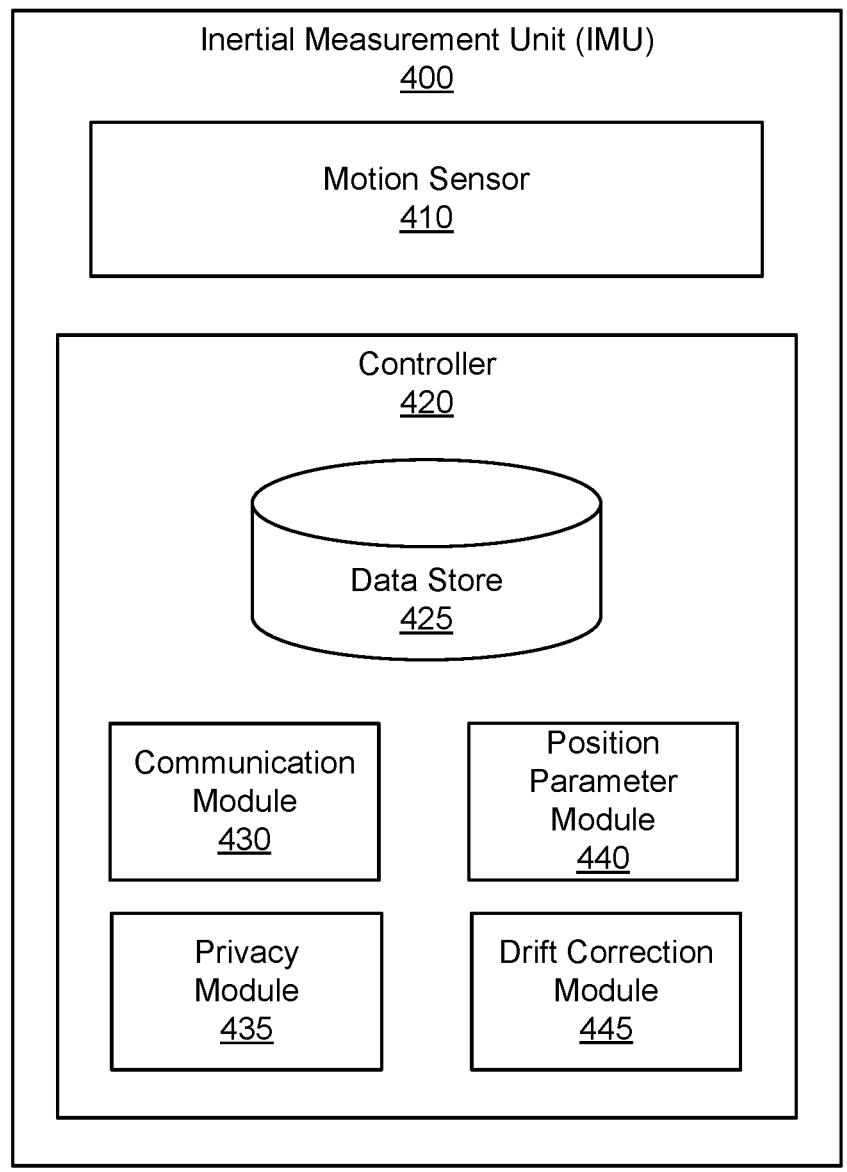
FIG. 4 is a block diagram of an inertial measurement unit (IMU), in accordance with one or more embodiments.

FIG. 4 is a block diagram of an inertial measurement unit (IMU) 400, in accordance with one or more embodiments. The IMU 190 may be an embodiment of the IMU 400. The IMU 400 determines the positioning and/or orientation of a device that contains the IMU 400. For instance, the IMU 400 may be located inside a headset. The IMU 400 performs drift compensation to correct for drift. In the embodiment of FIG. 4, the IMU 400 includes a motion sensor 410 and a controller 420. Some embodiments of the IMU 400 have different components than those described here. Similarly, in some cases, functions can be distributed among the components in a different manner than is described here. In some embodiments, the functions performed by the controller 420 may be performed by some other system on the headset device. In some embodiments, the functions performed by the controller 420 may be partially performed in the IMU 400 and partially performed by some other system on the headset device. In some embodiments, the functions performed by the controller 420 may be performed by a separate secondary device (e.g., the headset 325 and/or the mobile device 340).

The motion sensor 410 is configured to measure the position of the device containing the IMU 400 (e.g., a headset worn by a user). The motion sensor 410 in FIG. 4 is substantially the same as the motion sensor 195 of FIG. 1A or 1B. The motion sensor 410 may include one or more accelerometers, one or more gyroscopes, one or more magnetometers, another suitable type of sensor that detects acceleration and/or velocity measurements, or some combination thereof. In some embodiments, some or all of the motion sensors 410 may be located external to the IMU 400 and are communicatively coupled to the controller 420.

The controller 420 is configured to control the drift compensation process for the IMU 400. In the embodiment of FIG. 4, the controller 420 includes a data store 425, a position parameter module 440 and a drift correction module 445. In some embodiments, the controller 420 may also include a communication module 430 and a privacy module 435. Some embodiments of the controller 420 have different components than those described here. Similarly, functions can be distributed among the components in different manners than described here. For example, some functions of the controller may be performed external to the IMU 400 (e.g., on a remote server, on a separate system of the headset device, etc.).

The data store 425 stores data for use by the IMU 400. Data in the data store 425 may include acceleration measurements, velocity measurements, yaw measurements, roll measurements, pitch measurements, captured images, information about detected changes in audio, pose information, drift correction components, target vectors, privacy settings, and other data relevant for use by the IMU 400, or any combination thereof.

The communication module 430 may communicate with other devices (i.e., secondary devices) in accordance with the user's permissions and/or express authorization as stored in the privacy module 435. In some embodiments, the communication module 430 may communicate with one or more additional headsets in accordance with one or more privacy settings of the user. In some embodiments, the communication module 430 may communicate with one or more mobile devices (e.g., a smartphone) in accordance with privacy settings of the user. The communication module 430 may communicate via a network. The network is further described with reference to FIG. 3. The communication module 430 of the controller 420 may receive, in accordance with privacy settings of the user, one or more captured images of the user and/or information about a detected change in audio related to the user from one or more secondary devices. The communication module 430 of the controller 420 may receive, in accordance with privacy settings of the user, pose information about the user from one or more secondary devices. The communication module 430 of the controller 420 may provide, in accordance with privacy settings of the user, pose information about the user to one or more secondary devices.

The privacy module 435 may store one or more privacy settings for user data elements. The user data elements describe the user and/or the headset in such a manner that the user and/or headset may be identified and/or a location of the user and/or the headset may be identified. For example, the user data elements may include pose information about the user, one or more captured images of the user, captured audio of the user, or some combination thereof. Privacy settings (or "access settings") for the user data elements may be stored in any suitable manner, such as, for example, in association with the user data element, in an index on an authorization server connected to the network, in another suitable manner, or any suitable combination thereof. A user may opt in or opt out of sharing user data elements with other network-connected devices (i.e., with other secondary devices). A user may give express authorization for the sharing of user data elements depending on established connections made between the user and other secondary devices belonging to the user and/or established connections made between the user and other secondary devices belonging to another user. Established connections are determined by a social graph (e.g., a social network) of the user. The social graph of the user tracks all established connections. In embodiments, where express authorization is not established between two users, a user may be queried on a case by case basis whether user data elements may be shared with another user. The privacy module 435 operations are further described in FIG. 6.

The position parameter module 440 determines a set of position parameters for the IMU 400. In one embodiment, the position parameter module 440 receives a plurality of acceleration and/or velocity measurements from the motion sensors 410. The acceleration and/or velocity measurements are integrated over time to determine one or more position measurements. The one or more position measurements make up some or all of a set of position parameters for the IMU 400. For instance, the position parameters include a first yaw measurement, a first roll measurement, and a first pitch measurement. At least the first yaw measurement and the first roll measurement are included in the set of position parameters for the IMU 400. In some embodiments, the set of position parameters for the IMU 400 includes pose information determined by the position parameter module 440. The position parameter module 440 may determine pose information of the headset based in part on detected movement of the headset. The detected movement of the headset may be based at least in part on a change in audio detected by an audio system of a secondary device. The secondary device may provide information about the detected change in audio to the headset via the communication module 430. In some embodiments, the position parameter module 440 may determine pose information of the headset based in part on one or more images of the user of the headset captured by one or more imaging devices. The one or more images of the user include images of a head and a torso of the user. In one embodiment, the one or more images may be captured by the headset. In another embodiment, the one or more images may be captured by a secondary device. The position parameter module 440 generates subsequent yaw measurements, roll measurements, and pitch measurements that may also be included in the set of position parameters.

The drift correction module 445 compensates for drift present in the IMU 400 measurements over time. In one embodiment, the drift correction module 445 receives a set of position parameters from the position parameter module 440. This set of position parameters includes the first yaw measurement, the first roll measurement, and the first pitch measurement. The set of position parameters may be provided to other systems of the headset and/or other systems connected via the network. Based on the set of position parameters, a drift correction component is calculated and applied to subsequent IMU measurements.

The drift correction module 445 establishes an estimated nominal position vector (e.g., the estimated nominal position vector 240) that describes a nominal positioning of the IMU 400. The nominal positioning of the IMU of a headset worn by a user may be determined by considering biological constraints of the user. In one embodiment, the drift correction module 445 determines an average yaw measurement, an average roll measurement, and an average pitch measurement (e.g., for a predetermined period of time, for a predetermined number of measurements). The average values may be considered to be a pointing vector (e.g., the pointing vector 250). In one embodiment, the pointing vector is solely based on the set of position parameters determined by the position parameter module 440.

In some embodiments, the pointing vector is based on the set of position parameters determined by the position parameter module 440 and pose information for the IMU 400 determined by and/or provided by one or more secondary devices via the communication module 430. The pose information provided by the one or more secondary devices may include additional position measurements (i.e., a second yaw, roll, and pitch measurement), an indication the head positioning of the user has undergone a change (i.e., an indication the IMU 400 of a headset worn by the user has undergone a change), a notification of the type of change (i.e., a change in yaw, a change in roll, a change in pitch, or some combination thereof) of the head positioning (i.e., the IMU 400 positioning) has undergone, or some combination thereof.

For instance, the pose information provided may include a second yaw, roll, and pitch measurement for the IMU 400. The drift correction module 445 combines the second yaw, roll, and pitch measurements with the yaw, roll, and pitch measurements of the IMU 400 during the determination of the pointing vector. In this same example, the yaw, roll, and pitch measurements of the IMU 400 are weighted such that their contribution to the determination of the pointing vector is greater than the contribution of the secondary yaw, roll, and pitch measurements of the IMU. For instance, the yaw, roll, and pitch measurements of the IMU 400 are multiplied by a value greater than one prior to combining with the secondary yaw, roll, and pitch measurements of the IMU 400 in the determination of the pointing vector. In another example, the pose information provided may include a second yaw, roll, and pitch measurement for an IMU of a secondary device. The drift correction module 445 combines the second yaw, roll, and pitch measurements of the separate IMU with the yaw, roll, and pitch measurements of the IMU 400 during the determination of the pointing vector.

In another example, the pose information provided by a secondary device to the IMU 400 may include an indication the head positioning of the user has undergone a change and a notification of the type of change (e.g., a change in yaw and a change in roll). The drift correction module 445 receives this pose information and weights the yaw and roll measurements as determined by the motion sensors 410 of the IMU 400 accordingly. For instance, the yaw and roll measurements of the IMU 400 may be scaled up by one degree prior to the determination of the pointing vector.

In one embodiment, the pose information determined by a secondary device is based on captured images, captured audio, and/or secondary IMU measurements. In one instance, pose information determined using image analysis techniques may be weighted and/or scaled differently than pose information determined using sound analysis or secondary IMU measurements. In another embodiment, the weight applied for pose information related to audio analysis is weighted and/or scaled differently than pose information determined using image analysis or secondary IMU measurements.

The drift correction module 445 compares the pointing vector to the estimated nominal position vector. Any difference in measurements between the pointing vector and the estimated nominal position vector comprises an offset. The offset comprises one or more of a yaw value, a roll value, and a pitch value. The drift correction module 445 compensates for drift present in measurements of the IMU 400 if the offset yaw, roll, and/or pitch values are greater than or less than zero.

The drift correction module 445 compensates for drift present in measurements of the IMU 400 by determining a drift correction component. The drift correction component is a rate of correction that drives the estimated nominal position vector toward the pointing vector based on the offset yaw, roll, and/or pitch values. The drift compensation takes place at a rate (e.g., degrees over time) of correction. In some embodiments, the rate of correction may be based at least in part on the offset roll value, and the rate of correction is inversely proportional to the offset roll value. In some embodiments, the rate of correction may be proportionally scaled with an averaged velocity measurement for the IMU 400. The controller tracks the velocity measurements of the head turn and averages the velocity measurements for the predetermined time period. The rate of correction is scaled according to the average velocity. For example, as the average velocity increases the rate of correction increases. The drift correction module 445 applies the drift correction component to subsequent yaw, roll, and/or pitch measurements of the IMU 400. The application of the drift correction component effectively corrects for the offset values, thereby correcting drift present in measurements of the IMU 400.

Method for Correcting Drift of an IMU

FIG. 5 is a flowchart illustrating a process for correcting drift of an IMU 500, in accordance with one or more embodiments. The process shown in FIG. 5 may be performed by components of a headset (e.g., the controller 420). Other entities may perform some or all of the steps in FIG. 5 in other embodiments. For instance, a controller separate from the IMU may perform some or all of the steps in FIG. 5. Embodiments may include different and/or additional steps, or perform the steps in different orders.

The controller determines 510 a set of position parameters for a headset device worn by a user. The headset device includes an IMU. The set of position parameters may include a first yaw measurement and a first roll measurement. In one embodiment, the set of position parameters may include pose information about the user. The pose information may include additional orientation measurements (i.e., a second yaw, roll, and pitch measurement), an indication a head orientation of the user has undergone a change, a notification of the type of change (i.e., a change in yaw, a change in roll, a change in pitch, or some combination thereof) the head orientation has undergone, or some combination thereof. In one embodiment, the pose information may be determined at least in part by a secondary device. In one example, the secondary device may determine pose information by detecting a change in audio from the user that is associated with a change in head orientation. In another example, the secondary device may determine pose information by analyzing one or more captured images of a head (including the headset) and a torso of the user. In another example, the secondary device may determine pose information by utilizing an IMU integrated into the secondary device.

The controller calculates 520 a drift correction component based on the set of position parameters. For example, the drift correction component is determined based on an offset between the pointing vector and an estimated nominal position vector. Due to biological constraints of the head positioning of the user, the estimated nominal position vector is determined based on the nominal positioning of the head of the user. The drift correction component describes a rate of correction (i.e., describes a rate at which the offset may be corrected for in subsequent measurements of the IMU). In some embodiments, the drift correction component may include a yaw drift rate measured in degrees over time. The yaw drift rate may be inversely proportional to the amount of roll measured in the set of position parameters. In some embodiments, the drift correction component may further include a roll drift rate measured in degrees over time. The drift correction component may adjust for any drift error present in subsequent yaw measurements of the IMU.

The controller applies 530 the drift correction component to one more subsequent yaw measurements for the headset. The drift correction component forces the estimated nominal position vector towards a pointing vector at the rate of correction. The application of the drift correction component to the subsequent yaw measurements compensates for drift present in measurements of the IMU over time.

Artificial Reality System Environment

Figure 6:
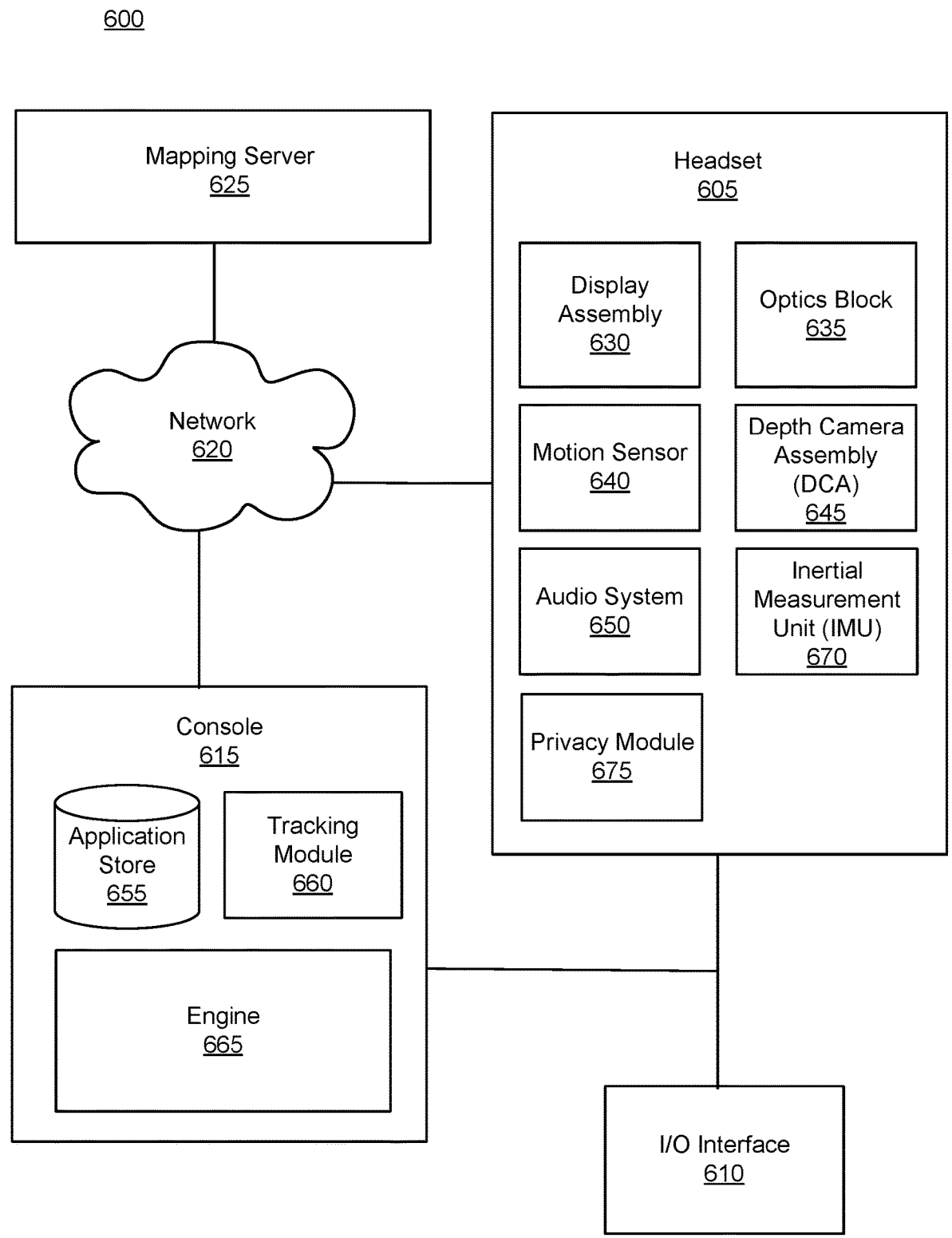
FIG. 6 is a system that includes a headset, in accordance with one or more embodiments.

FIG. 6 is a system 600 that includes a headset 605, in accordance with one or more embodiments. In some embodiments, the headset 605 may be the headset 100 of FIG. 1A or the headset 105 of FIG. 1B. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, the network 620, and the mapping server 625. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes a display assembly 630, an optics block 635, one or more motion sensors 640, a DCA 645, an audio system 650, an IMU 670, and a privacy module 675. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The motion sensor 640 is an electronic device that measures a position of the headset 605. The motion sensor 640 generates one or more measurement signals in response to motion of the headset 605. The motion sensor 195 and the motion sensor 410 are embodiments of the motion sensor 640. Examples of a motion sensor 640 include: one or more accelerometers, one or more gyroscopes, one or more magnetometers, another suitable type of sensor that detects motion, another suitable type of sensor that detects acceleration and/or velocity measurements, or some combination thereof. The motion sensor 640 may include multiple accelerometers to measure translational motion (forward/back, up/down, left/right) and multiple gyroscopes to measure rotational motion.

The DCA 645 generates depth information for a portion of the local area. The DCA includes one or more imaging devices and a DCA controller. The DCA 645 may also include an illuminator. Operation and structure of the DCA 645 is described above with regard to FIG. 1A.

The audio system 650 detects sounds within a local area surrounding the headset 605. The audio system 650 may comprise one or more acoustic sensors, one or more transducers, and an audio controller. The one or more acoustic sensors detect air pressure variations of a sound wave and convert the detected sounds into an electronic format (analog or digital). An acoustic sensor may be, e.g., acoustic wave sensors, microphones, sound transducers, or similar sensors that are suitable for detecting sounds. The one or more acoustic sensors may capture sounds emitted from one or more sound sources in the local area (e.g., a room). In one embodiment, the one or more acoustic sensors capture sounds emitted from one or more users wearing headsets. Increasing the number of sensors may improve the accuracy of information (e.g., directionality) describing a sound field produced by a sound from the local area.

The audio system 650 may determine pose information about one or more sound sources in the local area based on the captured sounds. In one embodiment, the audio controller of the audio system 650 may determine pose information of a sound source by comparing current DOA estimates with a stored history of previous DOA estimates. The audio controller may recalculate DOA estimates on a periodic schedule, such as once per second, or once per millisecond. The audio controller may compare the current DOA estimates with previous DOA estimates, and in response to a change in a DOA estimate for a sound source, the audio controller may determine that the pose of the sound source has changed. The pose information may be provided by the audio system 650 to a secondary device via the network 620. The audio system 650 provides audio content to a user of the headset 605.

The audio system 650 may provide spatialized audio content to the user via one or more transducers. In some embodiments, the audio system 650 may request acoustic parameters from the mapping server 625 over the network 620. The acoustic parameters describe one or more acoustic properties (e.g., room impulse response, a reverberation time, a reverberation level, etc.) of the local area. The audio system 650 may generate one or more sound filters using one or more of the acoustic parameters received from the mapping server 625, and use the sound filters to provide audio content to the user.

The IMU 670 determines the positioning and/or orientation of the headset 605. The IMU 670 is an embodiment of the IMU 400 described above. In one embodiment, the IMU 670 may comprise the motion sensor 640 and a controller. In other embodiments, the controller may be part of the headset 605 and separate from the IMU 670. The controller may determine a set of position parameters. These measurements may include a yaw measurement and a roll measurement. In some embodiments, the set of position parameters may include pose information about the user of the headset 605. The controller may calculate a drift correction component based at least in part on the set of position parameters. The controller applies the drift correction component to one or more subsequent yaw measurements for the IMU 670. The drift correction component forces the subsequent yaw measurements to a target vector over time, thereby compensating for drift present in measurements of the IMU 670 over time.

The privacy module 675 stores one or more privacy settings for user data elements. In some embodiments, the console 615 may contain a privacy module that stores one or more privacy settings for user data elements. The user data elements describe the user or the headset 605. For example, the user data elements may describe a physical characteristic of the user, an action performed by the user, a location of the user of the headset 605, a location of the headset 605, pose information about the user, an HRTF for the user, etc. Privacy settings (or "access settings") for a user data element may be stored in any suitable manner, such as, for example, in association with the user data element, in an index on an authorization server connected to the headset 605 via the network 620, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In one embodiment, the user may opt-in to allow the audio system 650 to record data captured by the audio system 650. In some embodiments, the audio system 650 may employ always on recording, in which the audio system 650 records all sounds captured by the audio system 650 in order to improve the experience for the user. The user may opt in or opt out to allow or prevent the audio system 650 from recording, storing, or transmitting the recorded data to other entities. In some embodiments, the user may opt-in to allow the DCA 645 to record image data captured by the DCA 645. The user may opt in or opt out to allow or prevent the DCA 645 from capturing, storing, or transmitting the captured images to other entities.

In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more motion sensors 640, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the IMU 670 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left based on received position information from the IMU 670, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 couples the headset 605 and/or the console 615 to the mapping server 625. The network 620 may also couple the headset 605 to other secondary devices (e.g., other headsets and/or mobile devices connected to the network 620). The network 620 is further described with reference to FIG. 3.

The mapping server 625 may include a database that stores a virtual model describing a plurality of spaces, wherein one location in the virtual model corresponds to a current configuration of a local area of the headset 605. The mapping server 625 receives, from the headset 605 via the network 620, information describing at least a portion of the local area and/or location information for the local area. The user may adjust privacy settings to allow or prevent the headset 605 from transmitting information to the mapping server 625. The mapping server 625 determines, based on the received information and/or location information, a location in the virtual model that is associated with the local area of the headset 605. The mapping server 625 determines (e.g., retrieves) one or more acoustic parameters associated with the local area, based in part on the determined location in the virtual model and any acoustic parameters associated with the determined location. The mapping server 625 may transmit the location of the local area and any values of acoustic parameters associated with the local area to the headset 605.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    calculating, by a controller, a drift correction component that describes a rate of correction, the drift correction component based at least in part on a pointing vector determined based in part on data from an inertial measurement unit (IMU) associated with a headset; and
    applying, by the controller, the drift correction component to one or more subsequent yaw measurements from the IMU, the drift correction component forcing an estimated nominal position vector towards the pointing vector at the rate of correction.

2. The method of claim 1, further comprising:
    detecting, by the controller, movement of a user of the headset based at least in part on a change in audio captured by a secondary device; and
    determining, by the controller, pose information about the user based on the change in audio, and
    wherein the pointing vector is based in part on the pose information.

3. The method of claim 1, further comprising:
    receiving, by the controller, one or more images of a user of the headset captured by one or more imaging devices, the one or more images of the user including images of a head and a torso of the user; and
    determining, by the controller, pose information about the user using the one or more images and the pose information including a head orientation measurement, and
    wherein the pointing vector is based in part on the pose information.

4. The method of claim 1, further comprising:
    detecting, by the controller, patterns of movement of a user of the headset over time, and
    wherein the estimated nominal position vector is based on the patterns of movement.

5. The method of claim 1, further comprising:
    receiving, by the controller via a network, a set of position parameters including at least a second yaw measurement and a second roll measurement, and
    wherein the pointing vector is based on the set of position parameters including at least the second yaw measurement and the second roll measurement.

6. The method of claim 1, wherein the drift correction component includes a yaw drift rate measured in degrees over time.

7. The method of claim 6, wherein the yaw drift rate is inversely proportional to an amount of roll measured.

8. The method of claim 6, wherein the drift correction component further includes a roll drift rate measured in degrees over time.

9. The method of claim 1, wherein the drift correction component adjusts for any drift error present in the one or more subsequent yaw measurements.

10. A headset comprising:
    an inertial measurement unit (IMU) configured to measure positions of the headset; and
    a controller configured to:
        calculate a drift correction component that describes a rate of correction, the drift correction component based at least in part on a pointing vector determined based in part on data from the IMU; and
        apply, by the controller, the drift correction component to one or more subsequent yaw measurements from the IMU, the drift correction component forcing an estimated nominal position vector towards the pointing vector at the rate of correction.

11. The headset of claim 10, wherein the controller is further configured to:
    detect movement of the headset based at least in part on a change in audio; and
    determine pose information of the headset based on the change in audio, and
    wherein the pointing vector is based in part on the pose information.

12. The headset of claim 10, wherein the controller is further configured to:
  receive one or more images of a user of the headset captured by one or more imaging devices, the one or more images of the user include images of a head and a torso of the user; and
  determine pose information about the user using the one or more images, the pose information including a head orientation measurement,
  wherein the pointing vector is based in part on the pose information.

13. The headset of claim 10, wherein the controller is further configured to:
  detect patterns of movement of a user of the headset over time, and
  wherein the estimated nominal position vector is based on the patterns of movement.

14. The headset of claim 10, wherein the controller is further configured to:
  receive, via a network, a set of position parameters including at least a second yaw measurement and a second roll measurement, and
  wherein the pointing vector is based on the set of position parameters including at least the second yaw measurement and the second roll measurement.

15. The headset of claim 10, wherein the drift correction component includes a yaw drift rate measured in degrees over time.

16. The headset of claim 15, wherein the yaw drift rate is inversely proportional to an amount of roll measured.

17. The headset of claim 15, wherein the drift correction component further includes a roll drift rate measured in degrees over time.

18. The headset of claim 10, wherein the drift correction component adjusts for any drift error present in the one or more subsequent yaw measurements.

19. A non-transitory computer readable storage medium storing instructions that, when executed by one or more processors, cause the one or more processors to perform operations comprising:
  calculating a drift correction component that describes a rate of correction, the drift correction component based at least in part on a pointing vector determined based in part on data from an inertial measurement unit (IMU) associated with a headset; and
  applying the drift correction component to one or more subsequent yaw measurements from the IMU, the drift correction component forcing an estimated nominal position vector towards the pointing vector at the rate of correction.

20. The non-transitory computer readable storage medium of claim 19, wherein the drift correction component adjusts for any drift error present in the one or more subsequent yaw measurements.

* * * * *